May 17, 1966  W. C. PFEFFERLE  3,251,652
PROCESS FOR PRODUCING HYDROGEN
Filed May 17, 1962
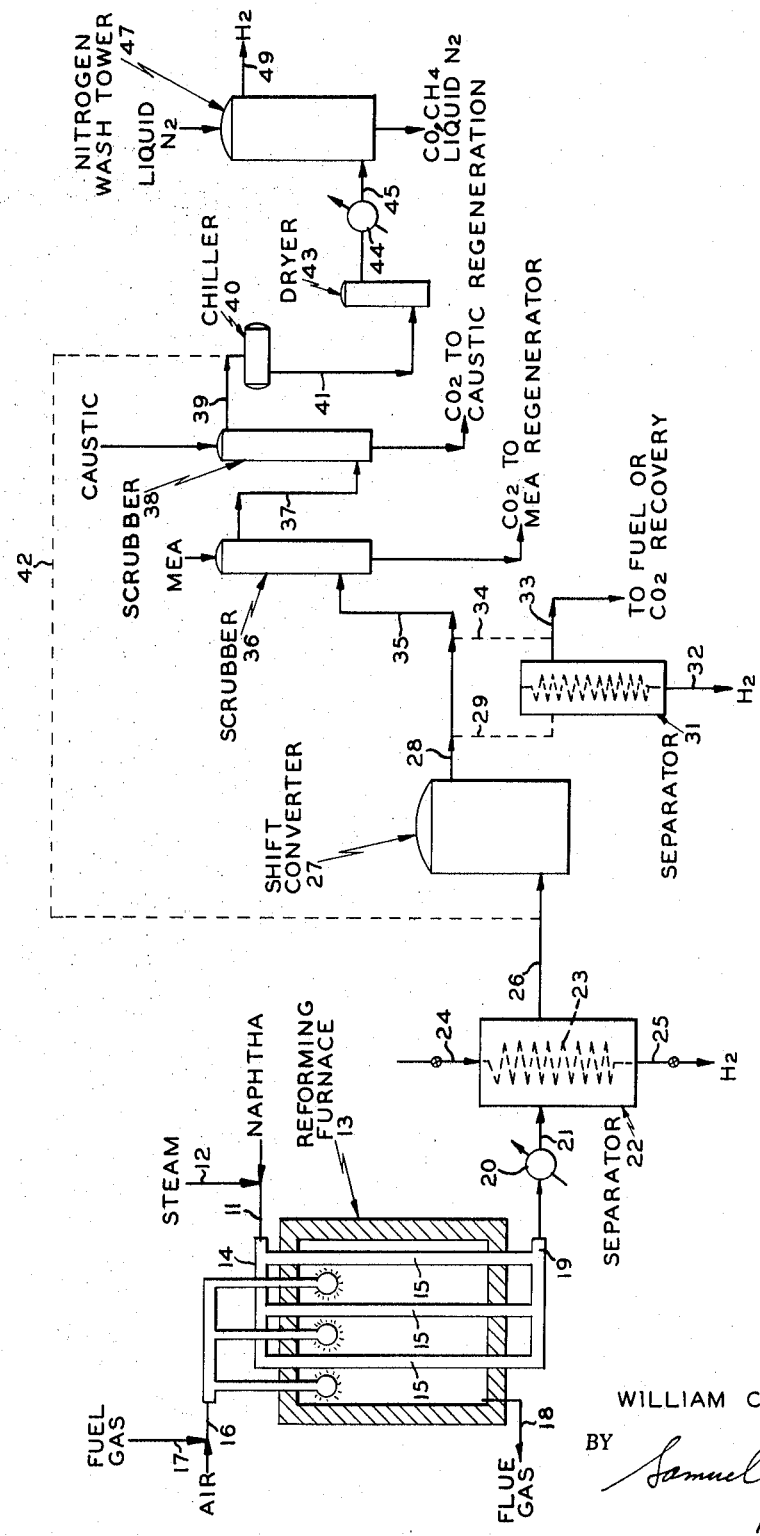
INVENTOR.
WILLIAM C. PFEFFERLE
BY *Samuel Kahn*
ATTORNEY

United States Patent Office 3,251,652
Patented May 17, 1966

3,251,652
PROCESS FOR PRODUCING HYDROGEN
William C. Pfefferle, Middletown, N.J., assignor to Engelhard Industries, Inc., Newark, N.J., a corporation of Delaware
Filed May 17, 1962, Ser. No. 196,048
11 Claims. (Cl. 23—213)

The present invention is directed to a method for producing hydrogen. More particularly, the invention is concerned with improvements in combination processes wherein gaseous mixtures containing hydrogen and carbon monoxide are first produced and then subjected to a carbon monoxide shift reaction for conversion of CO to carbon dioxide and hydrogen by reaction with steam. Specially, the invention is directed to such combination processes wherein techniques of hydrogen diffusion are utilized to provide advantageous improvements in known processes and to produce ultra-pure hydrogen at a cost and in amounts not hitherto commercially achieved.

The present invention may be briefly described as a method for producing hydrogen in which a carbonaceous or hydrocarbon feed is first subjected to reaction, for example with steam or with steam and air, under temperature and pressure conditions calculated to form a gaseous product containing substantial amounts of hydrogen and carbon monoxide. This gaseous mixture is separated and treated for removal of hydrogen by gaseous diffusion techniques. The resultant gaseous mixture, depleted in hydrogen, is subsequently contacted with steam over suitable catalysts to effect the conversion of carbon monoxide to carbon dioxide with the formation of further quantities of hydrogen, which may be recovered by gaseous diffusion or by conventional work-up methods.

During recent years, the industrial requirements for hydrogen have increased rapidly, and a variety of processes for the manufacture of hydrogen have been developed to fulfill this need. Large quantities of hydrogen are used, for example, in the synthesis of ammonia, methanol and the like; for catalytic hydrogenation, for example of oils to solid fats; in petroleum processes such as hydrofining; and as a fuel e.g. in missiles and in fuel cells for the generation of electricity. In many of these uses, high purity hydrogen, or hydrogen free from specific impurities, is desirable and often essential.

Among the many known processes for the industrial production of hydrogen are those which depend upon the initial conversion of a carbonaceous or hydrocarbon feedstock to a gaseous mixture containing hydrogen and carbon monoxide. Exemplary of such processes are the well known water-gas and producer-gas conversions in which coke or coal is reacted with steam (and air) to provide hydrogen-containing product gases; the steam reforming of hydrocarbons, especially methane in which hydrocarbons are converted to a mixture of carbon monoxide and hydrogen and the partial oxidation of hydrocarbons such as natural gas, kerosene or diesel oil to produce hydrogen and carbon monoxide. Each of these processes is effected at elevated temperature and pressure, and each is characterized by the production of gaseous mixtures containing hydrogen and carbon monoxide.

In general, processes for the industrial production of pure hydrogen from hydrogen-carbon monoxide mixtures employ a further reaction stage wherein the carbon monoxide is reacted with steam in a shift converter for the production of further quantities of hydrogen. The importance of the shift converter is two-fold. First, substantial additional quantities of hydrogen are readily obtained by reaction of the carbon monoxide contained in the feed gas, thus providing economic advantages in the shift converter. Secondly, carbon monoxide is found to be highly deleterious in subsequent reactions which utilize hydrogen. For example, minor quantities of carbon monoxide poison catalysts used for ammonia synthesis, a major end use of industrial hydrogen, also carbon monoxide acts as a poison in hydrogen oxygen fuel cells which utilize hydrogen as a fuel for the production of electricity.

The art has long faced the problem of recovering ultra-pure hydrogen from gaseous mixtures containing hydrogen and carbon monoxide, but until now no method has been available for removal of pure hydrogen from the associated impurities. As a result, the art has developed techniques for removing carbon monoxide and other impurities from gas streams containing hydrogen. In this connection, the importance of the CO shift reaction becomes clear.

A major proportion of the carbon monoxide in hydrogen-carbon monoxide mixtures, which may contain from about 10% to as much as 70% hydrogen by volume, and from about 1 to as much as 60% carbon monoxide (by volume), and is converted by the CO shift to hydrogen and carbon dioxide, which can readily be removed by washing or adsorption techniques from hydrogen. Even with the shift converter reaction, minor quantities of carbon monoxide appear in the hydrogen stream, and subsequent purification techniques must be used to reduce the CO content to the desired low levels, which may be below 10 p.p.m. or less. Typically, further scrubbing with cuprous ammoniacal solution under pressure, or working with liquid nitrogen is employed for removal of final traces of carbon monoxide. Alternatively, minor amounts of CO can be catalytically methanated at elevated temperatures and pressures according to the reaction

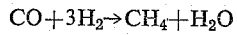

$$CO + 3H_2 \rightarrow CH_4 + H_2O$$

Methane remains in the gas as an inert, and carries through later reaction zones, e.g. in the synthesis loop for ammonia production.

The disadvantage of methanation is immediately apparent, since 3 moles of hydrogen are destroyed for each mole of carbon monoxide eliminated. Thus the hard-won hydrogen is sacrificed to remove final amounts of undesired impurity and presents an economic burden.

In accordance with the present invention, gaseous mixtures containing hydrogen and carbon monoxide which are to be utilized as feed for a CO-shift reactor are first subjected to a hydrogen removal step by contacting with one side of a metallic membrane permeable to hydrogen. Diffused hydrogen of high purity is separated from an undiffused gas stream preferably containing less than about 20% by volume hydrogen, which is then subjected to CO-shift reaction. Additional quantities of hydrogen which are formed in the CO-shift reactor are separated by diffusion techniques, or worked up according to known processes for hydrogen recovery.

Where the feed to the CO-shift is obtained from a hydrocarbon which has been subjected to a steam reforming reaction, the steam reforming can advantageously be effected according to my copending application Serial No. 196,552, filed May 15, 1962, wherein the steam reforming and H₂ diffusion steps are combined. The feed gas thus produced has been depleted in H₂ and is fed directly to the CO-shift reactor to remove the CO values.

Certain marked advantages are obtained by operating in accordance with the process of the present invention. In the first place, an extremely pure hydrogen effluent is obtained from a mixture containing carbon monoxide and hydrogen. This pure hydrogen stream is recovered at substantially no cost, since known processes for preparation of CO-H₂ mixtures operate at temperatures and pressures ideally noted for hydrogen diffusion. Thus gaseous effluents of various conversion reactions, such as the water-gas reaction or steam reforming reaction, can be processed directly for pure hydrogen recovery.

Secondly, removal of hydrogen from the H₂-CO mixture prior to effecting the CO-shift reaction provides a gaseous feed to the shift reactor which is greatly reduced in volume. The CO-shift reaction reaction is equilibrium limited, and it is difficult, if not impossible, to effect complete elimination of CO from the reaction mixture at practical levels of temperature and pressure. Removal of hydrogen prior to the CO-shift results in a substantially lower absolute amount of residual carbon monoxide which must be separated from the shift reactor effluent. Conventional adsorption and purification techniques can therefore be considerably reduced in size with substantial economies in overall processing to produce pure hydrogen.

Thirdly, a substantial advantage results from the utilization in a shift reactor of a hydrogen-depleted gas stream. As previously stated, the CO-shift reaction is equilibrium limited. The equation for such reaction is $$CO + H_2O \text{ (steam)} \rightleftarrows CO_2 + H_2$$

In such reaction, the equilibrium constant at a given pressure is given by $$Kp = \frac{p(CO_2) \times p(H_2)}{p(CO) \times p(H_2O)}$$

where $p(CO_2)$=the partial pressure of $CO_2$, etc. It will thus be seen that by removal of hydrogen, the partial pressure of hydrogen permitted by the equilibrium constant can be satisfied by reaction of CO and $H_2O$ to form hydrogen, thus permitting the reaction to go further in the direction of completion. Parenthetically, it should be observed that equilibrium considerations dictate a large excess of steam in the CO-shift reactor, again dictated by a desire to drive the reaction toward completion.

The gaseous mixtures of hydrogen and carbon monoxide which are utilized in the process of the present invention can be obtained in a variety of ways. One of the most widely practiced gas generating conversions is the so-called water-gas process in which solid fuels, such as coal or coke are reacted with steam at temperatures in the range of 1400 to 2100° F. and pressures of about 5 to about 100 atmospheres to produce gaseous mixtures containing carbon monoxide, hydrogen and minor amounts of carbon dioxide. The hydrogen content of such gases depends to a great extent on the specific temperature employed, as well as the ratio of steam to coke. The process may be illustrated by a series of possible chemical reactions as follows:

$$C + 2H_2O \rightarrow 2H_2 + CO_2$$
$$C + H_2O \rightarrow H_2 + CO$$
$$CO_2 + C \rightarrow 2CO$$
$$CO + H_2O \rightarrow CO_2 + H_2$$

The overall water-gas reaction being endothermic, heat must be supplied which is usually accomplished by the combustion of a portion of the carbonaceous feed with an oxidizing gas such as air and/or oxygen at about 1600–3000° F. The combustion reaction may be carried out either simultaneously with the water-gas reaction or alternatively in a make and blow fashion. Typically, gaseous mixtures obtained in this manner contain 35–50% CO, 40–60% H₂ and 5–10% CO₂ with small amounts of inerts such as nitrogen. Representative composition is 6% CO₂, 42% CO, 51% H₂ and 1% N₂.

An alternative method for the production of gaseous mixtures of hydrogen and carbon monoxide is the well known process for steam reforming of natural gas or methane. In this process, natural gas freed of sulfur compounds is admixed with steam, heated in a heat exchanger and passed to a methane-reforming furnace. In the furnace, the mixture of gas passes down through tubes packed with a suitable catalyst where the methane and other hydrocarbon content is reformed to obtain hydrogen and carbon monoxide. Such the reforming reaction is endothermic, sufficient heat for the reaction must be supplied by a combustion of feed in the furnace. In one method of commercial practice, air, in an amount sufficient to give the proper nitrogen to hydrogen ratio in the final gas, is added to the gas-steam mixture prior to reforming. Additional heat is thus supplied by the oxidation of a portion of the gas by the oxygen of the added air. Reformed gas leaving the converter usually has a relatively high carbon monoxide content, typical reform mixtures containing 10% CO₂, 15% CO, 73% H₂ and 2% inerts (CH₄ and nitrogen). Operation of the reforming reaction is usually effected at a temperature of 1500° to 1800° F. and pressure from about atmospheric to about 280 p.s.i.g.

Another technique for the production of major amounts of industrial hydrogen which has recently become of significance is the partial oxidation of gaseous or liquid hydrocarbons, e.g. methane, natural gas, hydrocarbons boiling in the kerosene range, and even diesel oil and crude oil. Partial oxidation of such hydrocarbon feeds can be effected with pure oxygen, or with mixtures of oxygen and steam (preferred where liquid hydrocarbons are employed as feed) at temperatures of 1700° F. to 2600° F. and pressures between about 250 p.s.i.g. and 500 p.s.i.g. In view of the reaction equilibria, higher operating pressures require more elevated temperatures. Partial combustion, for example of crude oil, is effected typically at 2600° F. and 450 p.s.i.g. to produce a gas containing roughly 47% CO and 46% H₂.

Gaseous mixtures containing hydrogen and carbon monoxide, whether prepared by the aforesaid typical commercial processes or by other equivalent methods, are contacted in accordance with the present invention with a hydrogen-permeable diffusion membrane for the separation of a pure diffused hydrogen stream, and the undiffused gases are further processed in a shift converter for the conversion of CO to CO₂ and hydrogen.

Methods for separating hydrogen from gaseous mixtures by permeating hydrogen through membranes of non-porous metal barriers such as tubes or foils of noble metals, especially palladium and palladium alloys, are known. A variety of techniques have been devised for effecting such processes, and any of the known methods for conducting such hydrogen separation process can be used in the present invention. For example, it is known to use thin tubes of hydrogen-permeable metal as a barrier means, the H₂ containing gases being contacted with one side of such tubes and pure diffused hydrogen being removed from the other side. Generally, hydrogen diffusion processes are effected at elevated temperatures and under conditions which establish a pressure differential across the diffusion barrier.

As an alternative to the use of thin metal tubes for diffusion separation of hydrogen, techniques have been devised which employ thin sheets or foils of hydrogen-permeable metal. Procedures and apparatus have been disclosed in the art for positioning or disposing such thin metal films or foils in suitable diffusion apparatus, including means for reinforcing or supporting such thin foils so as to make practicable operating pressure differentials across such foil barriers of the order of several hundred pounds. For example, Snelling U.S. Patent No. 1,174,631 discloses the use of thin platinum or palladium sheets disposed or supported upon porous backing materials such as porous earthenware or Alundum. Porous backings which are sandwiched between suitable foil diffusion barriers are disclosed in U.S. Patent No. 2,958,391, of A. V. de Rosset.

At the present time, commercial diffusion purification of hydrogen is generally carried out through tubing of palladium or its alloys, for example tubes of palladium-silver alloy of the type disclosed in U.S. Patent No.

2,773,561. Such materials provide rapid diffusion of essentially pure hydrogen gas, the diffused gas having less than 1 p.p.b. impurities.

Palladium and its alloys are particularly useful in the process of the present invention, since hydrogen diffuses through these materials at realistic commercial rates at temperatures ranging from about 400° F. to about 2000° F., preferably between about 570° F. and 1400° F. Gaseous mixtures containing hydrogen and carbon monoxide generally are produced at elevated temperatures, and thus require no additional heating to prepare them for the $H_2$ removal step, indeed may require some cooling to optimum operating temperatures.

The separation of hydrogen from gaseous mixtures by diffusion processes can be conducted at atmospheric or super-atmospheric pressure, the only requirement for effective diffusion being that a hydrogen partial pressure differential be maintained across the diffusion barrier. Highly effective rates of diffusion are obtained where the gases are fed to the diffusion apparatus at a pressure between 100 p.s.i.g. and 500 p.s.i.g., although higher pressures, e.g. 1000 p.s.i.g. or even higher can be employed. The particular pressure employed is dictated primarily by the construction details of the diffusion apparatus, which must be so designed as to withstand the overall pressure and the barrier pressure differentials employed. Again, the unique advantage of diffusion separation of hydrogen from gaseous mixtures of $H_2$ and CO are clear, in that such gaseous mixtures are generally produced at operating pressures of 100 to about 500 p.s.i.g., and can be fed directly to a hydrogen diffuser without intermediate repressuring or intensification.

Typical installations for hydrogen diffusion through palladium-25% silver alloy tubing may use, for example, 25 feet of 4-mil wall tubing of ⅛-inch diameter. Operation of such a unit at 450° C. and 150 p.s.i.g. $H_2$ partial pressure at the inlet will provide pure hydrogen gas at a rate of 27–30 s.c.f.h. (standard cubic feet per hour). About 114 square inches of diffusion cross section are provided, and about 2.70 troy ounces of the alloy are employed in fabricating such a unit.

Foil diffusers consisting of thinner gauge palladium-25% silver alloy, e.g. 0.8 mil thick, can provide similar hydrogen throughout (27–30 s.c.f.h.) if 22.8 square inches of diffusion surface are provided. In such case, three 3-inch foil disks would provide the same $H_2$ output as 25 feet of 4 mil tubing. Such foil diffusers can readily be designed to withstand operating pressure differentials as high as 500 p.s.i.g. by use of suitable supporting and backing means.

For example, a hydrogen diffusion apparatus which can be used in the process of the present invention is the tube bundle disclosed and claimed in U.S. Patent No. 2,911,057, of Robert S. Green et al. Such a tube bundle presents an extremely high surface area in a unit of small overall dimensions, and can readily provide higher rates of hydrogen separation from gaseous mixtures in accordance with the present invention.

It is important for the use of diffusion units according to the process of this invention that the CO and $CO_2$ and hydrocarbons have no harmful or poisoning effect on the diffusion units. A series of tests were performed using tubing of palladium and of palladium-25% silver as the diffusion elements. The upstream gas was a mixture (by volume) of approximately

| | Percent |
|---|---|
| $H_2$ | 70 |
| $CH_4$ | 20 |
| $C_2H_4$ | 5 |
| $C_2H_6$ | 3 |
| $CO_2$ | 1.5 |
| CO | 0.5 |

The tests were performed at 350° C. and at pressures of 215 and 415 p.s.i.a. The impure gases were, in some tests, in continuous contact with the diffusion elements for about two weeks.

Analysis of the rate of diffusion of the hydrogen showed that the presence of CO, $CO_2$, and the hydrocarbons did not have a harmful effect on the rate of diffusion of hydrogen through palladium or palladium-silver alloy.

Depending upon the particular process employed for production of the gaseous mixture of CO and $H_2$, the feed to the diffusion apparatus will vary in composition, and the particular gas composition is not critical to the operation of the process. Thus, such gas streams may contain from about 20–70% CO, from about 30 to about 75% hydrogen, up to 20% $CO_2$, and minor amounts of impurities such as unconverted methane. In general, hydrogen diffusion apparatus is provided having sufficient surface area for diffusion of hydrogen to provide an undiffused gas stream substantially reduced in hydrogen content. By no means is it essential to remove all hydrogen at this stage, since the undiffused gas effluent of the diffusion unit is to be further processed for generation of additional hydrogen in the CO-shift converter. Generally, from 20–90% of the hydrogen is removed in the diffuser, preferably 70–90%, to give an undiffused gas effluent containing less than 20%, for example between about 5 and about 15% hydrogen content (by volume).

Pure hydrogen which is separated as a diffused gas stream from the diffusion unit is suitable for direct utilization as a feed for ammonia synthesis, or as a fuel for fuel-cell use, or for other desirable purposes. In the event such hydrogen is to be used for ammonia synthesis, it may be advantageous to employ nitrogen as a sweep gas on the down-stream side of the diffusion unit to assist in removal of hydrogen and to provide directly a $H_2$-$N_2$ gas mixture suitable as feed to an ammonia synthesis reactor. Such sweep gas can be fed co-currently or countercurrently, the advantages of the latter type of operation being more fully disclosed in my copending application Serial No. 19,393, filed April 1, 1960, now U.S. Patent No. 3,144,313, issued August 11, 1964.

Undiffused gases from the upstream side of the diffusion apparatus are next subjected, in accordance with this invention, to a CO-shift reaction for the conversion of CO content thereof to $CO_2$ and additional $H_2$. The reaction conditions generally employed in a shift reactor are well known. It is contemplated that similar reaction conditions could be employed in the present process; however the present process is not limited to these conditions, e.g. of temperature, pressure and $H_2O$/steam ratio. The CO-shift reaction is carried out in the presence of steam, and the reaction is generally effected at whatever pressure the gas is available, and often promoted iron oxide catalyst is used. An excess of steam is employed in the usual CO-shift converter, and one of the advantages of the present process rests in the fact that, since much less gas is subjected to the shift reaction, a substantial decrease in the overall steam requirement is effected at this stage. Such steam as is required, is mixed with the undiffused gas effluent and then passed over the catalyst in the carbon monoxide converter. In the converter, steam reacts with carbon monoxide to form $CO_2$ and $H_2$, a substantial amount of heat being liberated in the process. Commercial installations normally effect the shift reaction in two stages, with intermediate water quenching for removal of heat, so as to maintain the converter at temperatures of between about 700 and 800° F. In this manner, a gaseous effluent is readily obtained containing less than about 5% CO by volume. In general, shift reaction conditions including temperatures in the range of about 650° F. and 1250° F. and pressures between about 5 and about 100 atmospheres are effectively employed.

It will be realized that the removal of hydrogen from the feed to the CO converter drastically reduces the amount of gas processed from a given amount of hydrocarbon feed. Additionally, while some CO remains in the effluent from the shift converter, the total amount of CO which must be removed by subsequent processing operations is radically reduced. As an example, elimination of 50% of the total reformer gas from a steam reforming operation (by separation as pure $H_2$ in a diffuser) results in a minimum of 50% reduction of gas to be processed after the shift converter reaction, and usually even greater reductions are obtained by reason of the more favorable equilibrium in the shift converter.

It is contemplated that gaseous effluent from the shift converter be processed in accordance with this invention, either by conventional methods, or by again applying the principles of hydrogen diffusion. In the latter case, a substantial proportion, for example 50–90% of the hydrogen contained in such gases is separated as a diffused gas stream in apparatus of the type hereinbefore described. The undiffused gaseous effluent, substantially depleted in hydrogen may then be processed for the removal of and/or separation of CO and $CO_2$. In the event hydrogen recovery by diffusion separation exceeds 90%, recovery of additional hydrogen may be uneconomical and the residual gases may be used as fuel or processed directly for recovery of pure $CO_2$, for example by refrigeration residual hydrogen is advantageously recycled to the shift converter.

Where the effluent from the shift converter is treated for $H_2$ recovery by conventional techniques, recourse may be had to traditional purification and washup procedures. Thus the shift converter effluent is treated by caustic and/or monoethanolamine scrubbing for removal of carbon dioxide. Because of the advantages gained in operating the shift converter in the absence of large excesses of hydrogen, substantially lower quantities of steam are used, and fewer problems of water condensation to prevent dilution of scrubbing mixtures are encountered. After removal of $CO_2$, the hydrogen-CO mixture may be recycled to the shift converter or further processed by nitrogen scrubbing, or treatment with cuprous ammoniacal solutions for reduction of CO content to an amount determined by the requirements of the process in which the hydrogen is used.

Having set forth its general nature, the invention will best be understood from the subsequent more detailed description wherein reference will be made to the accompanying drawing which illustrates a system suitable for carrying out a preferred embodiment of the invention.

Referring now to the drawing, numeral 11 designates a charge line by way of which a feed hydrocarbon such as methane, natural gas or naphtha is introduced into the system from a source not shown, and then flows, in admixture with steam introduced by line 12 into a furnace 13. Furnace 13 is a conventional reforming furnace provided with header 14 from which the hydrocarbon-steam mixture is distributed to tubes 15 each of which is charged with suitable reforming catalyst as, for example commercially available supported nickel oxide. Within furnace 13, the desired elevated temperatures for effecting reforming are attained by burning fuel gas introduced by line 16 and suitably admixed with air added by line 17. Spent flue gas exits the furnace by line 18. Conventional operation of such a reformer furnace is effected at a temperature of about 1200° F. to about 1800° F., and the design of furnace to provide this desired temperature at operating pressures of about 15 to 400 p.s.i.g. is well known to the art.

The steam reformate, comprising a gaseous mixture of $H_2$, CO, $CO_2$, steam and traces of unconverted hydrocarbon, passes from the furnace by collector 19 to cooler 20 where the temperature of the gaseous reformer effluent is adjusted by indirect heat exchange with water to provide utilizable process steam. Suitably cooled, for example to about 900–1200° F., the furnace gases are passed to diffusion separator 22 by line 21. Diffusion separator 22 is provided with suitable compartment means which permit contacting of the reformer effluent with one side of a hydrogen-permeable noble metal barrier, such as palladium or palladium alloy in the form of thin foils or thin tubes. In the drawing, the diffusion separator is shown as a coil 23, provided with valved inlet line 24 and valved exit line 25. In operation, hydrogen-containing gases are introduced into separator 22 and $H_2$ diffuses into coil 23 and is removed in ultra-pure form via line 25. In order to improve the rate of removal of hydrogen, sweep gas such as steam or $N_2$ may be introduced to the downstream side of the diffuser, as by line 24. In the event pure undiluted $H_2$ is desired, valved line 24 is blocked off.

Gases exiting diffuser separator 22 by line 26 are substantially depleted in hydrogen, and pass to CO-shift converter 27 wherein they are contacted with conventional shift catalyst such as supported iron oxide at elevated temperatures of about 700–1200° F. and pressure of 5 to 100 atmospheres. Converters 27 may be provided with cooling means (not shown) to maintain the shift reactor at the desired temperature by removing exothermic heat of the shift reaction.

Gases exiting the shift converter, now enriched in hydrogen by reason of the reaction of CO with steam pass by line 28 for recovery of further quantities of hydrogen by conventional techniques or by separation in suitable diffusion apparatus. In the latter case, shift converter product flows by line 29 to diffusion separator 30 wherein a major portion of the contained hydrogen is separated in coil 31 and drawn off by line 32. Undiffused gaseous product leaving the diffusion separator may be drawn off by line 33 for use as fuel or for recovery of the $CO_2$ content thereof. Alternatively, undiffused gases pass by line 34 to line 35 which leads to a conventional purification train for the removal of CO, $H_2O$ and $CO_2$ contaminants from hydrogen. As will be noted, the use of diffusion separator 30 is not essential, and in the event a separation step is not employed at this point, shift converter effluent passes directly from converter 27 via line 28 to line 35.

Shift converter effluent, whether or not further depleted in hydrogen content, is passed to suitable absorption apparatus for removal of $CO_2$ impurities. In the drawing, column 36 is provided for counter current scrubbing of the gaseous product with monoethanolamine solution, a major portion of the $CO_2$ being removed thereby. The gases are further purified by passage via line 37 to scrubber 38 wherein final traces of $CO_2$ are removed to provide a gaseous effluent containing less than about 20 p.p.m. $CO_2$ which is passed by line 39 to chiller 40 for removal of water contained therein. Substantially dry hydrogen containing residual CO exits chiller 40 by line 41. Alternately the gases from scrubber 38 may be recycled to the shift converter 27 via line 42 if diffusion separator 30 has been employed for removal of hydrogen from the shift converter product. In such case, the recycle stream may be fed directly to the shift converter via line 26 as shown, or alternately (not shown) may be fed to an auxiliary diffusion separator (not shown) prior to entering the shift converter or may be fed into diffusion separator 22 via line 21.

In the event no hydrogen has been removed from the shift converter product (separator 30 bypassed), the chiller effluent passes by line 41 to dryer 43 for removal of traces of moisture, the dry gases then being cooled in cooler 44 to −325° F. and passed by line 45 to nitrogen wash tower 47. Countercurrent washing in tower 47 with liquid nitrogen effects removal of trace quantities of CO and hydrocarbon, and pure hydrogen is delivered via line 49 for use.

From the above description of a suitable method of conducting the process of the present invention, it will be clear that various alternatives for the recovery of hydrogen can be employed. The selection of a particular mode of operation will be dictated by over-all process economics and the desire to maximize the recovery of hydrogen while operating under most beneficial conditions of temperature and pressure.

While the process of the present invention has been described with reference to a typical reforming operation in combination with a CO-shift reactor, it will be appreciated that any source of hydrogen-CO mixture can be treated for removal of hydrogen in order to enhance the shift reaction. In particular, the process of the present invention is valuable in processing hydrogen-CO streams which are obtained by continuous removal of hydrogen during the course of a reforming or other gaseous phase chemical reaction, as more fully disclosed in my copending application Serial No. 196,552, filed May 15, 1962. In operating according to such processes, the hydrogen removal step is integral with the $H_2$-CO producing reaction, and added advantages are provided in effecting such reactions under conditions of temperature and pressure not normally feasible without such hydrogen removal during the course of the reaction. The effluent gases from a reforming reaction which is effected under conditions to provide continuous removal of hydrogen as produced during hydrocarbon reforming are depleted in hydrogen, and provide suitable feeds for operation of a CO-shift reactor according to the present invention.

EXAMPLE I

A steam-naphtha stream (in the ratio of 5 to 1 steam per mol C) is fed to a steam reformer operated at 1520° F. and 13.3 atmospheres to provide a reformer effluent of the composition shown in column 2 of Table I. The reformer effluent is cooled to 1250° F. and fed to a hydrogen diffusion unit having a Pd-Ag diffusion element. In the diffusion unit, hydrogen is removed from the upstream mixture by diffusion through the hydrogen-permeable diffusion element. The partial pressure of the hydrogen in the residual mixture is reduced to about 1 atmosphere. Approximately 85% of the hydrogen is diffused through the hydrogen-permeable element and is available for use as hot ultra-pure hydrogen or may be exchanged to recover the heat.

The residual gas mixture, the hydrogen content of which has been reduced to a partial pressure of one atmosphere, is fed to a CO-shift converter at 1250° F. and 13.3 atmospheres.

The composition of the feed stream to the diffusion unit, the composition of the residual gas from the diffusion unit and the composition of the CO-shift effluent are given in Table II.

Comparison of Table I and Table II shows:

In a conventional process (Table I) using a naphtha steam feed to a steam reformer followed by cooling the effluent to 750° F. and feeding such effluent to a CO-shift converter:

Total conversion to $CO_2$ is about 82%.

Conversion to CO in the CO-shift converter is about 67%.

Table I
CONVENTIONAL STEAM REFORMING AND CO SHIFT COMBINATION FOR $H_2$ GENERATION

| Column 1 | Column 2 | Column 3 |
|---|---|---|
|  | Steam Reformer Effluent Operated at 1,520° F. and 13.3 atm. feed=naphtha | CO Shift Effluent 750° F. and 13.3 atm.[1] |
| $H_2$ _____mol percent__ | 37.3 | 41.4 |
| CO _____do____ | 6.1 | 2.0 |
| $CO_2$ _____do____ | 7.4 | 11.5 |
| $CH_4$ _____do____ | 0.5 | 0.5 |
| Steam_____do____ | 48.7 | 44.6 |
| Unreacted steam/mol C____ | 3.5 | 3.2 |
| Conversion Ratio $CO_2/CO$__ | 1.2 | 5.8 |

[1] Reformer Effluent must be cooled to 700–900° F. to be used as feed for Shift Reaction.

Table II
CO-SHIFT ACCORDING TO PROCESS OF THIS INVENTION, USING A TYPICAL FEED FROM STEAM REFORMING OF NAPHTHA

| Column 1 | Column 2 | Column 3 | Column 4 |
|---|---|---|---|
|  | Conventional Reformer Effluent (Feed to $H_2$ Diff.) 1,520° F. and 13.3 atm. | $H_2$ Diff.— Residual Gas[1] (Feed to CO Shift) 1,250° F. and 13.3 atm. | CO Shift Effluent,[2] 1,250° F. and 13.3 atm. |
| $H_2$ _____mol percent__ | 37.3 | 7.6 | 14.1 |
| CO _____do____ | 6.1 | 9.0 | 2.5 |
| $CO_2$ _____do____ | 7.4 | 10.9 | 17.4 |
| Unreacted H/C____do____ | 0.5 | 0.7 | 0.7 |
| Steam_____do____ | 48.7 | 71.8 | 65.3 |
| Unreacted steam/mol C__ | 3.5 | 3.5 | 3.2 |
| Conversion Ratio $CO_2/CO$__ | 1.2 | -------- | 7.0 |

[1] Partial pressure of $H_2$ reduced to 1 atm. or 85% $H_2$ removal.
[2] May be fed to $H_2$ Diff. Unit or may be purified by conventional methods.

In a process according to this invention, using a feed of the same composition as the conventional process and operating the CO-shift converter at 1250° F:

Total conversion to $CO_2$ is about 84%.

Conversion to $CO_2$ in the CO-shift converter is about 72%.

It is thus clear that substantially improved conversion is obtained by removal of hydrogen from reformer effluent prior to effecting the CO-shift reaction, and that such improved conversion is readily obtained even though the CO-shift reaction is effected at a temperature which is much higher than could be normally employed for the shift reaction.

EXAMPLE II

A steam-naphtha steam (in the ratio of 5 to 1 mol steam per mol C) is fed to a steam reformer provided with hydrogen diffusion means integral with the steam reforming reactor so as to remove hydrogen as formed during the reforming reaction. Removal of hydrogen permits operation of the reformer at a temperature of about 1200° F. and 14 atmospheres. The hydrogen in the steam reforming zone is maintained at about 1 atm. and the effluent from the steam reformer is given in column 2 of Table III. Such effluent is cooled to 700° F. and fed to a CO-shift converter. The composition of the CO-shift effluent is given in column 3 of Table III.

Note that the total conversion to $CO_2$ in the combined process is 92%.

Table III

FEED TO CO-SHIFT FROM REFORMER ACCORDING TO CASE I

| Column 1 | Column 2 | Column 3 |
|---|---|---|
|  | Effluent from Ref. According to Case I, 1,200° F. and 14 atm. | CO-Shift Effluent, 700° F. and 14 atm. |
| $H_2$ _____mol percent__ | 7.1 | 13.1 |
| CO _____do____ | 10.0 | 4.0 |
| $CO_2$ _____do____ | 59.5 | 65.5 |
| Unreacted H/C_____do____ | 1.5 | 1.5 |
| Steam_____do____ | 22.0 | 16.0 |
| Unreacted steam/mol C_____ | 0.3 | 0.2 |
| Conversion Ratio $CO_2/CO$_____ | 6.0 | 16.3 |

What is claimed is:

1. A process for the preparation of hydrogen which comprises contacting a gaseous mixture containing from about 30 to 75% by volume hydrogen and from about 1 to about 60% by volume carbon monoxide with one side of a palladium-containing hydrogen permeable membrane, separating a diffused hydrogen stream and an undiffused gas stream substantially depleted in hydrogen and containing less than about 20% by volume hydrogen, contacting said undiffused gas stream in the presence of steam with a catalyst under CO shift-reaction conditions including a temperature of about 650° to about 1250° F. and a pressure between about 5 and about 100 atmospheres to convert CO contained therein to $CO_2$ and $H_2$ and recovering the hydrogen from the shift reaction effluent.

2. The process of claim 1 where the shift reaction effluent is contacted with one side of a hydrogen-permeable noble metal membrane and hydrogen is recovered from the other side of said membrane as a diffused gas stream.

3. The process of claim 2 wherein the hydrogen depleted shift reaction effluent is treated for removal of $CO_2$ and the CO and $H_2$ contained in said effluent are recycled to the shift converter.

4. A combination process for the production of hydrogen which comprises the steps of gasifying solid carbonaceous materials with steam and oxygen in a water gas generation zone at a temperature between about 1400° and 2100° F. and a pressure from about 5 to 100 atmospheres to produce a gaseous effluent containing from 40 to 60% hydrogen and from 35 to 50% carbon monoxide, contacting said effluent with one side of a palladium-containing hydrogen-permeable membrane at a temperature between about 550° and 1800° F., separating a diffused hydrogen stream and an undiffused gas stream containing less than about 20% by volume hydrogen, contacting the undiffused gas stream in the presence of steam with a catalyst under CO shift reaction conditions including a temperature of about 650° to about 1250° F. and a pressure between about 5 and about 100 atmospheres to convert CO contained therein to $CO_2$ and $H_2$ and recovering the hydrogen from the shift reaction effluent.

5. A combination process for the production of hydrogen which comprises the steps of reacting a mixture of steam and an aliphatic hydrocarbon feedstock having from 1 to 20 carbon atoms in the molecule with a steam reforming catalyst in a reaction zone at a temperature between about 1500° and 1800° F. and a pressure from about atmospheric to about 280 p.s.i.g. to produce a gaseous effluent containing steam and gas including hydrogen, carbon monoxide and carbon dioxide, contacting said effluent with one side of a palladium-containing hydrogen-permeable membrane to separate a diffused hydrogen stream containing from 20 to 90% of the hydrogen in said gaseous effluent from an undiffused gas stream containing less than about 20% by volume of hydrogen, and contacting the undiffused gas stream with a second catalyst under CO shift reaction conditions including a temperature of about 650° to about 1250° F. and a pressure between about 5 and about 100 atmospheres to convert CO contained therein to $CO_2$ and hydrogen and recovering the hydrogen from the shift reaction effluent.

6. The process of claim 5 wherein said steam reforming catalyst is a nickel containing catalyst.

7. The process of claim 5 wherein said second catalyst is an iron containing catalyst.

8. The process of claim 5 wherein the feedstock is natural gas.

9. The process of claim 5 wherein the feedstock is naphtha.

10. A combination process for the production of hydrogen which comprises the steps of partially oxidizing a hydrocarbon feedstock with oxygen containing gas at a temperature between 1700° F. and 2600° F. and a pressure between about 250 p.s.i.g. and 500 p.s.i.g. to produce a gaseous mixture containing hydrogen, carbon monoxide and carbon dioxide, contacting said gaseous mixture with one side of a palladium-containing hydrogen-permeable membrane to separate a diffused hydrogen stream containing from 20 to 90% of the hydrogen in said gaseous mixture from an undiffused gas stream containing less than about 20% by volume of hydrogen, and contacting the undiffused gas stream with a catalyst under CO shift reaction conditions including a temperature of about 650° to about 1250° F. and a pressure between about 5 and about 100 atmospheres to convert CO contained therein to $CO_2$ and hydrogen and recovering the hydrogen from the shift reaction effluent.

11. The process of claim 10 wherein said catalyst contains iron oxide.

References Cited by the Examiner
UNITED STATES PATENTS

| | | | |
|---|---|---|---|
| 366,081 | 7/1887 | Edgerton | 48—224 |
| 1,124,347 | 1/1915 | Snelling | 23—212 X |
| 1,934,472 | 11/1933 | Allen | 23—2.3 X |
| 2,565,395 | 8/1951 | Scharmann | 23—212 |
| 2,637,625 | 5/1953 | Garbo | 23—2.1 |

FOREIGN PATENTS

| | | |
|---|---|---|
| 579,535 | 7/1959 | Canada. |

OTHER REFERENCES

Chemical Engineering, vol. 60, No. 7 (1953), p. 133.

BENJAMIN HENKIN, *Primary Examiner.*

MAURICE A. BRINDISI, *Examiner.*

A. J. STEWART, E. STERN, *Assistant Examiners.*